United States Patent [19]

Terry

[11] Patent Number: 5,165,752
[45] Date of Patent: Nov. 24, 1992

[54] BICYCLE SADDLE FOR WOMEN

[76] Inventor: Georgena Terry, 1891 Dublin Rd., Penfield, N.Y. 14526

[21] Appl. No.: 753,798

[22] Filed: Sep. 3, 1991

[51] Int. Cl.$^5$ ............................................. B62J 1/18
[52] U.S. Cl. .................................... 297/214; 297/202
[58] Field of Search ................ 297/202, 214, 195, 453

[56] References Cited

U.S. PATENT DOCUMENTS

| 591,145 | 10/1897 | Seaman | 297/202 X |
| 606,031 | 6/1898 | Rusch | 297/202 |
| 654,720 | 7/1890 | Englebert | 297/202 |
| 1,205,241 | 11/1916 | Mesinger | 297/202 X |
| 4,012,072 | 3/1977 | Hansen | 297/214 X |

FOREIGN PATENT DOCUMENTS 604537  7/1948  United Kingdom ................ 297/214

*Primary Examiner*—José V. Chen
*Attorney, Agent, or Firm*—Howard J. Greenwald

[57] ABSTRACT

A novel bicycle saddle especially useful for female cyclists is disclosed. This saddle contains a base and a cushion. The cushion contains two resilient sections which have different physical properties such as, e.g., different densities, indentation load deflection ratings, tensile strengths, and elongations.

17 Claims, 3 Drawing Sheets

BICYCLE SADDLE FOR WOMEN

FIELD OF THE INVENTION

A bicycle saddle especially configured for use by female cyclists.

BACKGROUND OF THE INVENTION

Bicycle saddles are well known to those skilled in the art. These saddles have been around for many years, and for many years they have been causing discomfort to the genital areas of bicycle riders. Thus, in 1932, Fred Blake disclosed in his U.S. Pat. No. 1,858,477 a bicycle saddle which contained an interior cavity designed to receive the genital organs of the rider. This design, however, tended to cause the bicycle rider to slide forward into the cavity of the saddle, and the rider would continually have to readjust his position on the saddle. Furthermore, because the saddle was constructed of a material which was substantially impermeable to air, this saddle was not comfortable for use in hot and humid climates.

Many attempts have been made to provide a saddle which solves all of the problems involved with the use of the Blake saddle; none of these attempts, however, has provided a saddle which is especially suitable for use by women cyclists.

As late as 1978, little progress had been made in the art of saddle design. Thus, for example, in his U.S. Pat. No. 4,098,537, David L. Jacobs disclosed (at column 1) that "Although considerable effort, and significant advances, have been realized in achieving comfort and performance through the development of bicycle seat pads and bicycle seat frames, insufficient attention has been placed upon saddle design per se. In this regard it is believed that room for significant improvement exists."

However, the saddle disclosed in U.S. Pat. No. 4,098,537 is not suitable for female cyclists. Although the disclosure of this patent is not clear, it appears that the saddle consists essentially of only one type of polyurethane material. The saddle construction of this patent does not provide the required combination of support to the pelvic zone and comfort to the pubic zone required by female cyclists. Furthermore, the saddle of this patent does not provide adequate ventilation.

In 1990, because the prior art saddle designs were not suitable, yet another saddle which provided a central cut-out of arrowhead shape was disclosed in U.S. Pat. No. 4,898,422 of West. Although this saddle was in some respects better than the prior art saddles, it suffered from the same disadvantage as the cut-out saddle of Blake: it tended to cause the cyclist to slide forward into the cut-out area and, thus, did not provide stable support. Furthermore, the saddle of this patent was not specifically designed to support a woman's pelvic area and pubic area or to ventilate either of such areas during use of the saddle.

The sorry state of the prior art of bicycle saddles for women was described in 1990 by Susan Weaver, in her book entitled "A Woman's Guide to Cycling" (Ten Speed Press, Berkeley, Calif., 1990). At pages 131-132 of this book, in describing the anatomical saddles currently available for female cyclists, she states that: "A woman's anatomical saddle is a little wider and shorter than a man's saddle. . . . Anatomic saddles do not suit every woman, however. I talked to Susan Notorangelo about something she's come to call 'smash,' a term for 'swollen genitals'. . . . What causes this problem? A woman's pelvic structure is different from a man's in yet another way: the arch of the pubic symphisis is shallower in women. As we lean forward on the saddle, that pubic arch may compress tender genital tissues against the seat."

It is an object of this invention to provide a saddle for female cyclists whose use will not cause irritation to a woman's genitals.

It is another object of this invention to provide a saddle for female cyclists which will provide stable support for the cyclist.

It is another object of this invention to provide a saddle for female cyclists which, during use thereof, will ventilate the cyclist's genital area.

It is yet another object of this invention to provide a saddle for female cyclists which will provide a different amount of support to the cyclist's pelvic area than is provided to the cyclist's pubic area.

It is yet another object of this invention to provide a anatomical saddle for female cyclists which is relatively inexpensive to produce.

It is yet another object of this invention to provide an anatomical saddle for female cyclists which is more durable than prior art anatomical saddles comprised of opencell foam material.

It is yet another object of this invention to provide an anatomical saddle for female cyclists whose use is less likely to cause vaginal yeast infections than is the use of prior art anatomical saddles.

SUMMARY OF THE INVENTION

In accordance with this invention, there is provided a saddle for female cyclists. The saddle is comprised of a base, a cushion, and a cover. The base contains at least two sections, at least one of which is air-impermeable, and at least one of which is air-permeable. The cushion consists essentially of resilient material.

BRIEF DESCRIPTION OF THE DRAWINGS

The present invention will be more fully understood by reference to the following detailed description thereof, when read in conjunction with the attached drawings, wherein like reference refer to like elements, and wherein.

DESCRIPTION OF THE PREFERRED EMBODIMENTS

Figure 1:
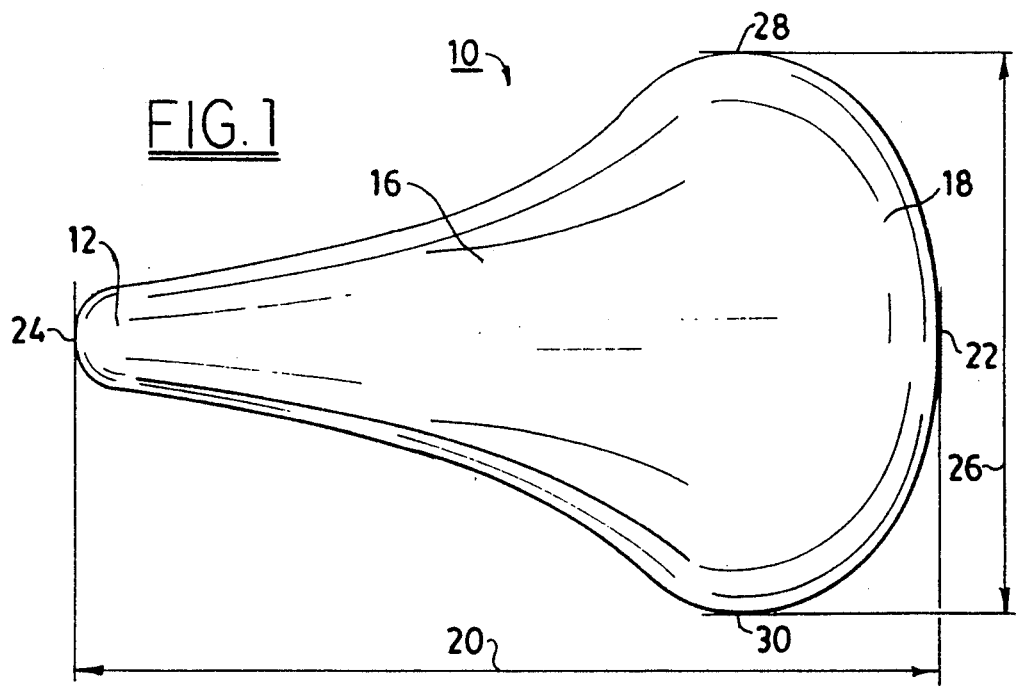
FIG. 1 is a top view of a preferred embodiment of the saddle of this invention.

Referring to FIG. 1, applicant's saddle 10 is illustrated. Applicant's saddle 10 has an anatomic shape especially adapted to support a woman's pelvic and pubic area.

Figure 2:
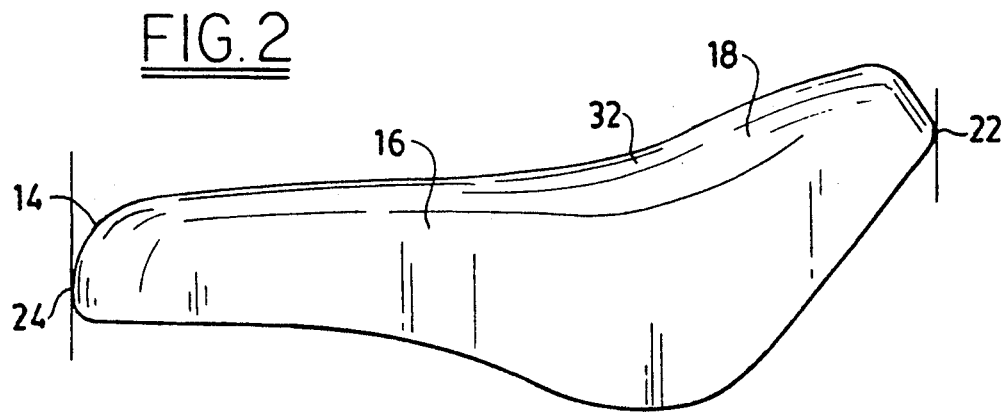
FIG. 2 is a side view of the embodiment of FIG. 1.

Applicant's saddle is preferably substantially wedge-shaped and preferably includes a narrow leading end portion 12 having a downwardly turned tip 14 (see FIG. 2), a central transition portion 16, and a flared, trailing end portion 18 (also see FIG. 2).

The maximum length 20 of saddle 10, as measured from point 22 to point 24 (see both FIGS. 1 and 2), will generally range from about 8.5 to about 10.5 inches and, preferably, ranges from about 9 to about 10 inches.

The maximum width 26, of saddle 10, measured from point 28 to point 30, is from about 5.0 to about 8.5 inches and, preferably, is from about 6 to about 7.25 inches.

In one preferred embodiment, the ratio of maximum width 26 to maximum length 20 is at least about 0.7 for saddle 10. In another embodiment, the ratio of maximum width 26 to maximum length 20 is from about 0.4 to about 0.6.

Figure 3:
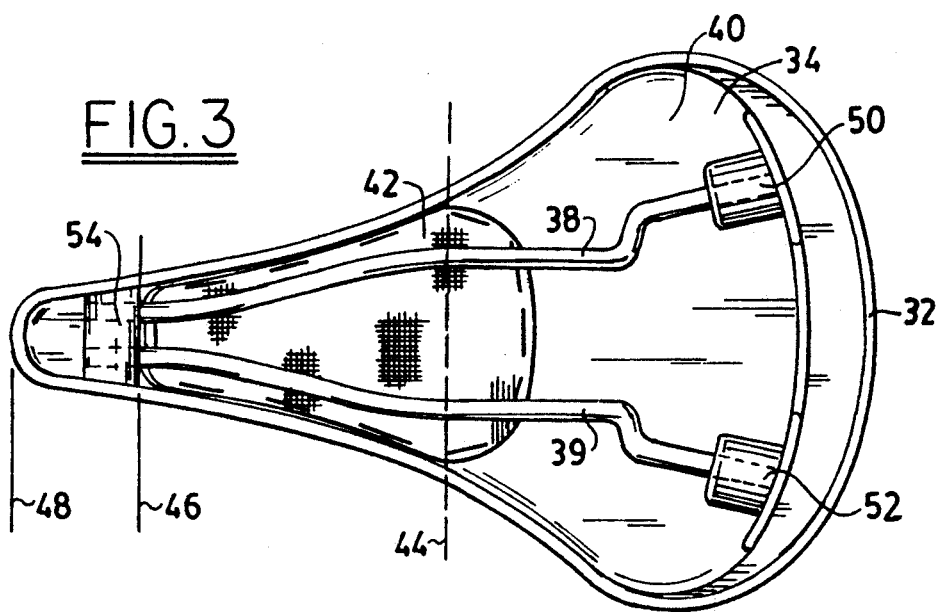
FIG. 3 is a bottom view of the embodiment of FIG. 1.

Referring to FIG. 3, it will be seen that saddle 10 is comprised of cover 32 and support 34, rail 38, and rail 39.

Cover 32 is a flexible, resilient, air-permeable material adapted to fit over and enclose the cushion of the saddle 10 (not shown in FIG. 3). Cover 32 may consist of or be comprised of any of the cover materials well known to those skilled in the art. Thus, by way of illustration and not limitation, cover 32 may be made from leather, "COOL-MAX" (a high-performance knit fabric containing polyester fiber manufactured by the E.I. du Pont de Nemours and Company of Wilmington, Del. which meets an Apr. 15, 1990 certification standard published by DuPont), cotton, sheepskin, polyester, "SUPPLEX LYCRA" (a spandex material which is sold by the E.I. du Pont de Nemours and Company), nylon, and the In one preferred embodiment, the cover material 32 and/or the fabric material 42 is comprised or consists of the woven fabric described in U.S. Pat. No. 4,634,625 of Franklin, the disclosure of which is hereby incorporated by reference into this specification. This woven fabric is comprised of textured continuous filament polyester warp yarns in combination with spun filling yarns. The textured continuous filament polyester yarns comprise filaments of denier of from about 1 to about 4.5 derived by draw-texturing feed yarn filaments of elongation to break about 80–180% and of scalloped-oval cross-section.

The support 34 is also preferably substantially wedge-shaped and has substantially the same dimensions and shape as does saddle 10; thus, such support will have substantially the same ratio of maximum width to maximum length.

In one embodiment, applicant's support 34 is comprised of substantially rigid portion 40 and an air-permeable fabric portion 42. The fabric portion 42 covers an orifice (not shown) in rigid portion 40 which has substantially the same shape and the same size as fabric portion 42.

In another embodiment, not shown, the air-permeable portion of the base is provided by perforating the rigid section in the portion of said base which, in the prior embodiment, contained the fabric section and/or the orifice. In yet another embodiment, the air-permeable section is provided by providing said orifice and leaving it uncovered.

The cross-sectional area defined by the air permeable section (such as, e.g. by fabric portion 42) and/or of said orifice is preferably (but not necessarily) less than the cross-sectional area defined by rigid portion 40. However, a major portion of the area of the first half of the support 34 is defined by the air-permeable (e.g., fabric) portion 42 (and by said orifice). If one were to divide the maximum length 20 by 2 the midpoint of saddle 10 can be determined by drawing a line 44 substantially perpendicular to the transverse axis (not shown) of saddle 10. The area of support 34 which is defined by that portion of the fabric portion 42 which is to the left of line 44 is at least 60 percent (and preferably at least 80 percent) of the total area of support 34 which is to the left of line 44. Thus, referring again to FIG. 3, the area of the fabric section between lines 44 and line 46 (which is a line drawn contiguous with the end of fabric portion 42) is also at least 60 percent (and preferably at least 80) of the total area between lines 44 and 48.

Referring again to the preferred embodiments illustrated in the Figures, the fabric portion 42 covers a resilient section 58 of applicant's saddle. Thus, again referring to midpoint 44, the area of the resilient section 58 between lines 44 and 46 is at least 60 percent (and, preferably, at least 80 percent) of the total area between lines 44 and 48.

In one preferred embodiment, the cross-sectional area of fabric section 42 (and of the orifice which it covers), when divided by the sum of the cross sectional areas of sections 42 and 40, is from about 0.23 to about 0.075. In general, regardless of which embodiment is involved, the cross-sectional area of the air-permeable section of the base is at least 0.075 times as great as the cross-sectional area of the entire base.

Referring again to FIG. 3 rigid section 40 may be permeable or impermeable, or both. As used in this specification, the term permeable refers to a material which allows fluid or gas to pass through it. Thus, this property can be measured in accordance with A.S.T.M. Standard Test D737-75 (Reapproved 1980), "Standard Test Method for Air Permeability of Textile Fabrics." In this test, the rate of air flow through the material is measured under a differential pressure between the two fabric surfaces.

In one preferred embodiment, rigid section 40 (excluding its orifice which is covered by the fabric section) is substantially impermeable, i.e. it has a permeability of substantially zero.

Fabric portion 42, however, is preferably permeable, having an air permeability of from at least 100 cubic feet per minute and, more preferably, at least 150 cubic feet. In an even more preferred embodiment, the permeability of fabric portion 42 is at least 190 cubic feet per minute.

In one embodiment, cover 32 also is permeable, having an air permeability of from at least 100 cubic feet per minute and, more preferably, at least 150 cubic feet. In an even more preferred embodiment, the permeability of cover 32 is at least 190 cubic feet per minute.

Rigid section 40 is preferably comprised of a plastic material which can be injection molded and which has a flexural stiffness of from about 10,000 to about 12,000 kilograms per square centimeter. In one embodiment, rigid section 40 has a flexural stiffness of about 11,000 kilograms per square centimeter. As is known to those skilled in the art, the flexural stiffness of plastic material may be measured in accordance with A.S.T.M. Standard Test D-747-86, "Test Method for Apparent Bending Modulus of Plastics by Means of a Cantilever Beam."

As is known to those skilled in the art, many plastic materials may be used to produce rigid section 40. Thus, for example, one may use high-density polyethylene with a specific gravity of at least 0.959, polypropylene with a specific gravity of at least 0.9, nylon, and the like. By way of illustration and not limitation, thus, one may use an "ALATHON" resin (a polyethylene resin sold by the E.I. du Pont de Nemours and Company), a "PETROTHENE" polypropylene resin (sold by U.S. Industrial Chemicals Company of 11500 Northlake Drive, Cincinnati, Ohio), "TENITE" polypropylene resin (sold by the National Lead Company, Baroid Division, Houston, Tex.), and the like.

The material of which rigid section 40 consists also preferably has a torsional stiffness of from about 5,000 to about 7,000 kilograms per square centimeter and, more preferably, from about 5,700 to about 6,500 kilograms per square centimeter. As is known to those skilled in the art, torsional stiffness may be measured by A.S.T.M. test D1043-87, "Test Method for Stiffness Properties of Plastics as a Function of Temperature by Means of a Torsion Test."

Fabric portion 42 consists essentially of fabric. As used in this specification, the term fabric refers to a woven cloth of organic or inorganic filaments, threads, or yarns.

The fabric used in portion 42 consists essentially of fiber. In one preferred embodiment, such fiber is polyester fiber.

Referring again to FIG. 3, in the preferred embodiment shown therein, the saddle 10 is comprised of rails 38 and 39 which reinforce support 34. In this embodiment, rails 38 and 39 provide a means of attaching saddle 10 to the bicycle seat post (not shown). It will be apparent to those skilled in the art that other means of attaching saddle 10 may be used in addition to or in place rails 38 and 39.

Referring again to FIG. 3, it will be seen that rails 38 and 39 are secured to sockets 50, 52, and 54. It is preferred that these sockets 50, 52, and 54 be integrally formed as a part of support 34. Thus, in one embodiment, a solid plastic member comprised of sockets 50, 52, and 54 is injection molded by conventional techniques. Thereafter, a cavity is cut into such member, and fabric is attached over this cavity to form fabric portion 42.

Rails 38 and 39 may be constructed of materials well known to those skilled in the art such as, e.g., steel. As will be apparent to those skilled in the art, rails 38 and 39 may have the standard configuration and composition used in prior art bicycle saddles.

Figure 4:
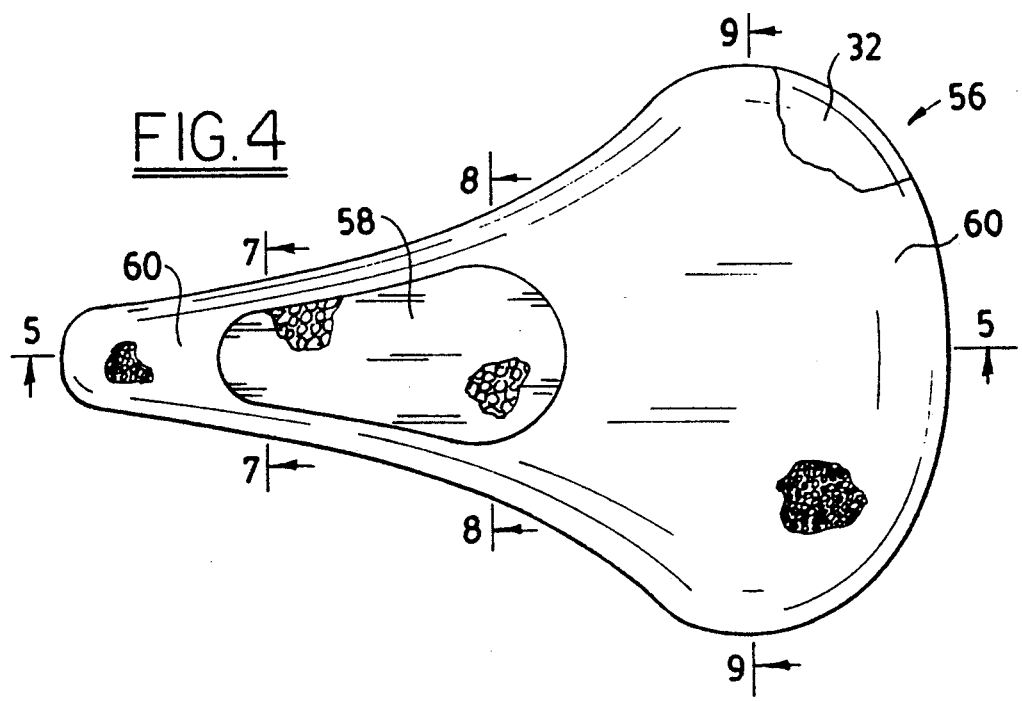
FIG. 4 is a top view of the cushion of the saddle of the embodiment 1.

FIG. 4 is a top view of saddle 10 with its cover removed. Referring to FIG. 4, it will be seen that cushion 56 is comprised of at least a first resilient section 58 and a second resilient section 60.

It is preferred that each of resilient sections 58 and 60 consist essentially of foam material. However, as will be apparent to those skilled in the art, other resilient materials may be used in the saddle. In the remainder of this specification, for the purposes of brevity, reference will be made to a foam material, it being understood that other resilient materials also may be used.

Foam sections 58 and 60 preferably consist essentially of foam material. As is known to those skilled in the art, foam materials have a spongelike, cellular structure. By way of illustration, suitable foam materials include sponge rubber, polyurethane foams, cellular rubber, and the like. These and other foam materials are described on pages 329–330 of George S. Brady et al.'s "Materials Handbook," Twelfth Edition (McGraw Hill Book Company, N.Y., 1986).

In the embodiment illustrated in the Figures, each of foam sections 58 and 60 extend substantially from the bottom of the cushion to its top. In another embodiment, not shown, 1 only foam layer 60 extends to the top of the cushion. In yet 1 another embodiment, not shown, only foam layer 58 extends to the top of the cushion.

Regardless of the construction used, and whether foam layers 58 and/or 60 extend from the bottom and/or to the top of the cushion, the top of applicant's cushion has specified physical properties (such as an indentation load deflection rating) in at least two resilient sections.

In one preferred embodiment, both foam sections 58 and 60 consist essentially of polyurethane foam. As is known to those skilled in the art, these foams are made by adding a compound that produces carbon dioxide, or by reaction of a diisocyanate with a compound containing active hydrogen.

In one preferred embodiment, a polyurethane foam sold under the name of "CONFOR" is used in sections 58 and/or 60. This foam, which is sold by the E-A-R Specialties Composites of 7911 Zionsville Road, Indianapolis, Ind., is an open-celled polyurethane foam with a nominal density (as measured by A.S.T.M. Standard test D3574 of from about 5.7 to about 6.4 pounds per cubic foot, an impact absorption (as measured by A.S.T.M. Standard Test F355, modified with an 11 pound missile dropped at a rate of 3.4 meters per second from a height of 24 inches) of from 58 to 165, a compression set (as measured by A.S.T.M. Standard Test 03574, conducted at 70 degrees Celsius for 22 hours, 25 percent compression) of from about 0.3 to about 0.9 percent deflection from original thickness), and an indentation force deflection (as measured by A.S.T.M. Standard Test D3574 Test B1, at 25 percent deflection and a temperature of 21 degrees Celsius) of from about 4 to about 27 pounds of force. Thus, by way of illustration, one may use foams such as "CONFOR" CF-40 Yellow, CF-45 Blue, and CF-47 Green. These foams, and the properties of the CONFOR foams, are described in E-A-R Specialty Composites Technical Data Sheet TDS-13.

In one preferred embodiment, foam section 58 consists essentially of only one foam, and foam section 60 consists essentially of another foam. However, as will be apparent to those skilled in the art, either or both of foam sections 58 and/or 60 may contain a mixture of foams, a laminated structure, etc., as long as the physical properties of such foam sections are as described hereinbelow. These physical properties refer to the entire foam section and not to the individual foam(s) contained therein.

It is preferred that each of foam sections 58 and 60 have a density of at least 4.0 pounds per cubic foot.

The physical properties of foam section 58 differ from the physical properties of foam section 60, and this difference is one of the reasons why applicant's saddles possesses its many unique features.

The cross-sectional area of section 58 is generally less than the cross sectional area of section 60. In general, section 58 has a cross-sectional area which is from about 12 to 25 percent of the cross-sectional area of section 60. It is preferred that the cross-sectional area of section 58 be from 15 to 22 percent of the cross-sectional area of section 60. In one even more preferred embodiment, the cross-sectional area of section 58 is from about 17 to about 20 percent of the cross-sectional area of section 60.

Foam section 58 is substantially softer than foam section 60, as reflected by the indentation load deflection properties of each of these sections. The indentation load deflection properties of the foam sections are measured by the A.S.T.M. Test described above, test A.S.T.M. D3574. In this test, the force necessary to produce 25 percent indentation in the foam product, at a temperature of 21 degrees Celsius, is measured. In order to obtain 25.0 percent deflection, foam section 58 requires from about 4 to about 8 pounds of force. Foam section 60 requires from about 10 to about 27 pounds of force to obtain the 25 percent deflection under the same conditions.

The density of sections 58 and 60 may be measured in accordance with A.S.T.M. D3574. The density of foam section 58 ranges form about 5.5 to about 5.7 pounds per cubic foot. The density of foam section 60 ranges from 5.8 to 6.1 pounds cubic foot.

The compression set of section 58 may be measured in accordance with International Standards Organization ("ISO") Standard Test 1856, "Determination of Compression Set." This test is conducted for 75 percent level of compression for 22.0 hours at a temperature of 70 degrees Celsius. In one preferred embodiment, under these test conditions, the compression set of section 58 is preferably from about 7 to about 11 percent and, more preferably, from about 8 to about 10 percent.

The compression set of section 60 is determined in accordance with the aforementioned ISO standard test. Under these conditions, and in one preferred embodiment, it has a compression set of from about 3 to 7 percent, and, preferably, from about 4 to 6 percent.

The tensile strengths of sections 58 and 60 are determined in accordance with A.S.T.M. Standard Test D3574. Under these test conditions, section 58 preferably has a tensile strength of from about 13 to about 22 pounds per square inch and, more preferably, from about 13 to about 20 pounds per square inch. Section 60 has a tensile strength of from about 22 to 28 pounds per square inch and, more preferably, from about 23 to 27 pounds per square inch.

The elongation of sections 58 and 60 also may be determined by A.S.T.M. Standard Test D3574. The elongation of section 58 preferably ranges from about 90 to about 140 percent and, more preferably, 95 to 110 percent. The elongation of section 60 preferably ranges from about 85 to 115 and, more preferably, from about 90 to 110 percent. In general, section 58 has a elongation which is at least about 1.1 times as great as the elongation of the foam in section 60.

Figure 5:
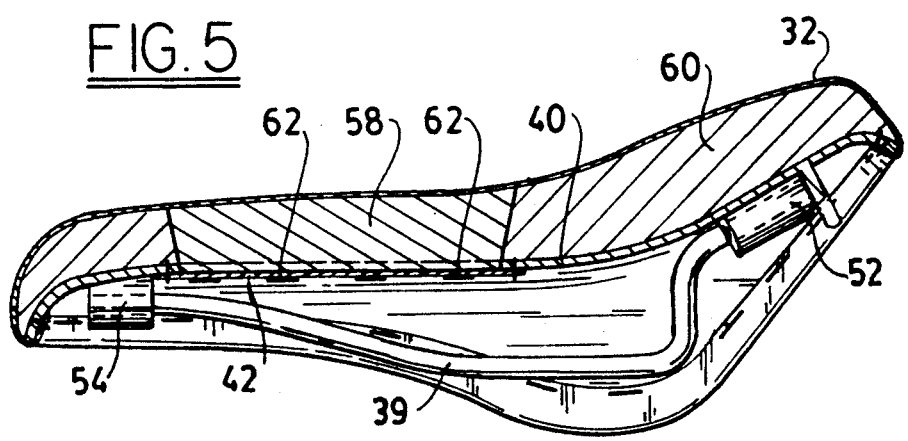
FIG. 5 is a sectional view of the embodiment of FIG. 4, taken along lines 5—5.

FIG. 5 is a sectional view of the embodiment of FIG. 4, taken along lines 5—5. Referring to FIG. 5, it will be seen that fabric section 42 may be secured to rigid section 40 by conventional means such as adhesive, sewing, staples, and the like. In the embodiment illustrated in FIGS. 5 and 6, staples 62 may be used by themselves and/or in conjunction with adhesive to fasten the fabric section 42 to the rigid section 40. As will also be seen by reference to FIGS. 5 and 6, in the preferred embodiment illustrated in these Figures, fabric section 42 covers substantially the entire lower surface of foam section 58.

Figure 6:
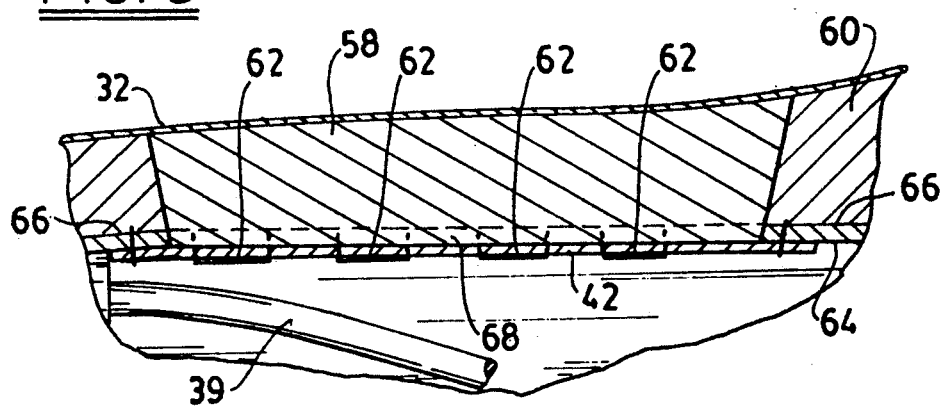
FIG. 6 is partial sectional view of the embodiment of FIG. 4.
Figure 7:
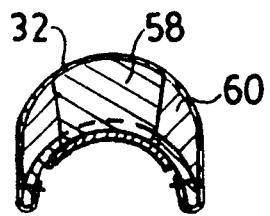
FIG. 7 is a sectional view of the embodiment of FIG. 4, taken along lines 7—7.
Figure 8:
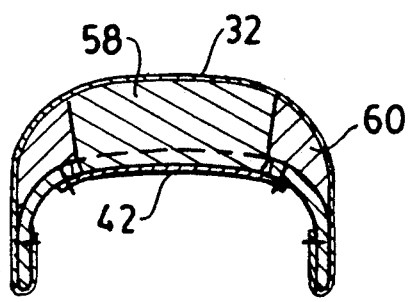
FIG. 8 is a sectional view of the embodiment of FIG. 4, taken lines 8—8.
Figure 9:
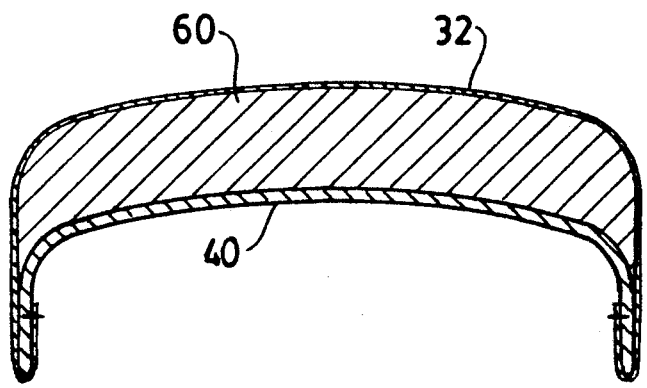
FIG. 9 is a sectional view of the embodiment of FIG. 4, taken along lines 9—9.

In the embodiment illustrated in FIGS. 5 and 6, fabric section 42 is attached to the outer surface 64 of rigid section 40. In another embodiment, not shown, fabric section 42 is attached to the inner surface 66 of rigid section 40. It is preferred, however, in both embodiments to have fabric section 42 cover substantially the entire lower surface 68 of foam section 58.

It will be appreciated by those skilled in the art that, although applicant's claimed bicycle saddle is especially suited for use by women, it may also advantageously be used by male riders.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A bicycle saddle comprised of a front, a back, a base, and a cushion with a bottom cushion surface and a top cushion surface which is attached to said base, wherein:
   (a) said base is comprised of a substantially rigid section comprising at least one air-permeable section, wherein said air-permeable section has a cross-sectional area which is at least 0.075 times the cross-sectional area of said base;
   (b) said cushion is an integral structure which is comprised of at least a first resilient foam section and a second resilient foam section, wherein said first resilient foam section extends form said top cushion to said bottom cushion surface, said second resilient foam section is connected to and surrounds said first resilient foam section, and wherein:
   1. said first resilient foam section of said cushion has a cross-sectional area which is at least 60 volume percent of the cross-sectional area of the section of said saddle extending from said front of said saddle to the midpoint of said saddle;
   2. said first resilient section has an indentation load deflection rating, at 25 percent deflection and 21 degrees Celsius, which is from 4 to 8 pounds of force;
   3. said second resilient section has an indentation load deflection rating, at 25 percent deflection and 21 degrees Celsius, which is from 10 to 27 pounds of force;
   4. said first foam section has a density of from 5.5 to 5.7 pounds per cubic foot;
   5. said second foam section has a density of from 5.8 to 6.1 pounds per cubic foot;
   6. said first foam section has a tensile strength of from 13 to 22 pounds per square inch;
   7. said second foam section has a tensile strength of from 22 to 28 pounds per square inch;
   8. said first foam section has an elongation which is at least 1 times as great as the elongation of said second foam section; and
   9. said first foam section has a first top foam surface, said second foam section has a second top foam surface, and said first top foam section and said second top foam section are in substantially the same plane.

2. The bicycle saddle as recited in claim 1, wherein said bicycle saddle is comprised of a flexible, resilient airpermeable cover.

3. The bicycle saddle as recited in claim 2, wherein the cross-sectional area of said orifice is at least 0.075 times as great as the cross-sectional area of said base.

4. The bicycle saddle as recited in claim 3, wherein said orifice is covered by a fabric.

5. The bicycle saddle as recited in claim 4, wherein said fabric is attached to said substantially rigid section.

6. The bicycle saddle as recited in claim 1, wherein said substantially rigid section is comprised of an orifice.

7. The bicycle saddle as recited in claim 1, wherein each of said first resilient section and said second resilient section consists essentially of foam material.

8. The bicycle saddle as recited in claim 7, wherein said foam material is polyurethane foam.

9. The bicycle saddle as recited in claim 8, wherein said polyurethane foam has a nominal density of from about 5.7 to about 6.4 pounds per cubic foot, a compression set of from about 0.3 to about 0.9 percent deflection from original thickness, and an indentation load deflection of from about 4 to about 27 pounds of force.

10. The bicycle saddle recited in claim 1, wherein said first resilient section has a cross-sectional area which is from about 8 to about 25 volume percent of the cross-sectional area of said second resilient section.

11. The bicycle saddle as recited in claim 1, wherein said saddle is substantially wedge-shaped.

12. The bicycle saddle as recited in claim 1, wherein said first resilient section is substantially in the shape of an ovoid.

13. The bicycle saddle as recited in claim 1, wherein said substantially rigid section is comprised of an orifice.

14. The bicycle saddle as recited in claim 13, wherein the cross-sectional area of said orifice is at least about 0.075 times as great as the cross-sectional area of said base.

15. The bicycle saddle as recited in claim 14, wherein said orifice is covered by an air-permeable fabric.

16. The bicycle saddle as recited in claim 15, wherein said air-permeable fabric is attached to said substantially rigid section and to said first resilient section.

17. The bicycle saddle as recited in claim 16, wherein each of said first resilient section and said second resilient section consist essentially of polyurethane foam.

* * * * *